US006954928B2

(12) United States Patent
Allsop et al.

(10) Patent No.: US 6,954,928 B2
(45) Date of Patent: Oct. 11, 2005

(54) METHOD FOR SELECTING A SET OF PATCHES TO UPDATE A SYSTEM OF PROGRAMS

(75) Inventors: Brent Allsop, Fort Collins, CO (US); Evan Rudolph Zweifel, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 618 days.

(21) Appl. No.: 09/924,773

(22) Filed: Aug. 8, 2001

(65) Prior Publication Data

US 2003/0033597 A1 Feb. 13, 2003

(51) Int. Cl.[7] ........................... G06F 9/44; G06F 9/445
(52) U.S. Cl. ....................................... 717/168; 717/174
(58) Field of Search ................................. 717/168–178

(56) References Cited

U.S. PATENT DOCUMENTS

| | | | | |
|---|---|---|---|---|
| 6,289,509 B1 | * | 9/2001 | Kryloff | 717/170 |
| 6,363,524 B1 | * | 3/2002 | Loy | 717/170 |
| 6,477,703 B1 | * | 11/2002 | Smith et al. | 717/168 |
| 6,493,871 B1 | * | 12/2002 | McGuire et al. | 717/173 |
| 6,526,574 B1 | * | 2/2003 | Jones | 717/168 |

* cited by examiner

*Primary Examiner*—Antony Nguyen-Ba

(57) ABSTRACT

An automated method is described for searching through sets of software patches to select a recommended set for installation into any given system. Each patch is assigned a ranking based upon how thoroughly it has been tested. Patches that modify the same filesets are organized within a database into tree structures, with the newest patches closest to the tree's root. A recursive function examines all the patches in all the trees relevant to a given system and returns a set of patches recommended for installation.

12 Claims, 12 Drawing Sheets

FIG. 16

```
ROOTS =        { PATCH_4, PATCH_11, PATCH_13, PATCH_15, PATCH_16 }   1602
INSTALLED =    { PATCH_1, PATCH_5, PATCH_9, PATCH_14 }   1604

RESULT OF FUNCTION "FIND_ALL_I_R_L" EQUALS:                          1606

     {    (PATCH_1,   PATCH_3,   PATCH_4 ),   1608
          (PATCH_5,   PATCH_10,  PATCH_11),   1610
1612      (PATCH_9,   PATCH_10,  PATCH_11),
          (PATCH_14,  NULL,      PATCH_13),   1614
1616      (NULL,      PATCH_15,  PATCH_15),
1618      (NULL,      NULL,      PATCH_16)   }
```

METHOD FOR SELECTING A SET OF PATCHES TO UPDATE A SYSTEM OF PROGRAMS

BACKGROUND OF THE INVENTION

The present invention relates generally to techniques for maintaining programming systems, and more particularly, to methods for selecting which sets of program corrections or "patches" are to be installed in accordance with the security needs of a particular organization.

When programs are installed upon a computer system, the programs are constituted of a large number of individual files which are grouped together into what may be called "filesets." For example, in FIG. 2 at 200, a systems database is shown which lists the names of various systems (SYSTEM A, SYSTEM B, etc.) and then lists following each system's name the "filesets" that are installed upon that system and the files which each of those "filesets" contain. For example, the SYSTEM A contains the FILESETS FS1 and FS2. The FILESET FS1 is shown in FIG. 2 as containing the files FILE A, FILE B, . . . , and FILE F. Likewise, the FILESET FS2 is shown as containing the files FILE J, FILE K, . . . , and FILE P.

As time passes, both through the detection of defects in the various files and also through changes in the needs of the users of the system, corrections and improvements are made to the files that comprise a given system. These are distributed in the form of "patches" each of which contains a number of files that are basically updates and improvements to the files previously installed. It is customary to group all the files contained within a given patch into one or more filesets, and to give the filesets within a patch the same names as the filesets to which they correspond in the actual systems. Accordingly, and with reference to FIG. 3 at 300, a PATCHES DATABASE is shown. A first patch, named PATCH_5, contains a fileset named FILESET FS1 which contains only an updated copy of the single file FILE A. In practice, all computer systems containing FILESET FS1 would be updated with PATCH_5. The updating process replaces a copy of the FILE A originally installed on the system with the newly revised copy of FILE A that is contained within the patch.

Over time, further patches are issued for a given system. In FIG. 3, an additional patch, PATCH_8 contains updates for FILESET FS2 which, in this case, constitutes the single updated file FILE K. At a later time, an even newer patch, PATCH_6 issues which contains updates for both the file sets FILESET FS1 and FILESET FS2. Of necessity, the patch PATCH_6 coming later in time than the other two patches, PATCH_6 includes all the updates of the earlier patches plus some new updates. More specifically, the patch PATCH_6 includes a set of updated files named FILESET FS1 that replace both FILE A and FILE F, as well as another set named FILESET FS2 which contains replacement copies of FILE K and FILE P. As is apparent, if the SYSTEM A had not previously been updated with the patches PATCH_5 and PATCH_8, that system could be fully updated with the single patch PATCH_6 and would not need updating with the earlier patches. In that sense, the patch PATCH_6 SUPERSEDES and replaces the earlier patches, which may be called "predecessors" of PATCH_6. In the discussion which follows, a "predecessor" patch is sometimes called a "child" patch, and "predecessors" are sometimes called "children."

FIG. 4 at 400 presents a patch tree database which illustrates a way in which the historical and shared file relationships between patches can be represented in a searchable database. In FIG. 4, the newest patch PATCH_6 is shown in a central column that is labeled ROOT PATCHES. Extending to the left from this newest patch is a patch tree structure, which in this case contains only the two patches PATCH_5 and PATCH_8 shown as two limbs of a tree that converges upon the root PATCH_6. The tree portion of FIG. 4 is labeled TREE PATCHES to distinguish it from the ROOT PATCHES portion which contains the root of the patch trees. To the left in FIG. 4 is a column labeled FILESETS which simply lists all the filesets that are contained within the root patches of the patch trees. While only one patch tree is shown in the patch tree database 400, typically such a database would contain numerous trees each having a root patch and each relating to a number of different filesets. For example, the patch trees shown in FIG. 15 at 1500 could occupy a common patch tree database 400.

FIGS. 4 and 15 also illustrate a number in parenthesis opposite the name of each patch. This number indicates the reliability of each patch. A rating of "1" indicates that a patch is new and has undergone little testing. A rating of "2" indicates that the patch has been available for use for some limited amount of time and has been installed on at least some minimal number of systems. A rating of "3" indicates that the patch has undergone some system testing. Clearly, a higher rated patch corresponds to a more tested patch and therefore a more reliable patch.

In the past, it has been customary any time a system is updated to install only the newest set of root patches that contain filesets corresponding to the filesets installed on a given system. In this manner, a system is kept up-to-date. However, some of the patches installed may not have undergone sufficient testing to suit the needs of a system that is mission critical and that should not be updated with patches until they have undergone fairly thorough testing. A trained technical expert can go through all the patches, looking at the date of each patch and estimating its reliability, and can then select patches which have been around for sufficient time so that their reliability is fairly certain. However, this is a time consuming process that can also result in erroneous selections.

SUMMARY OF THE INVENTION

Briefly described, the present invention is a method for selecting the patches for installation on a given system. First, from a system database, one obtains the names of all the patches that have already been installed on the system, and one also retrieves the names of the system's filesets. Using a patch tree database, one selects the root patches that contain updates for the filesets found within the system. Next, using the patch trees associated with the root patches, one then systemically and recursively searches through the patch trees examining each patch in each patch tree and the sub-tree beyond each patch, and either recommending patches that are either new patch recommendations or successors for previously installed patches, with the ratings of the patches playing a significant role in the selection of the set of recommended patches such that the currency of each is balanced against its reliability as indicated by their ratings to determine which patches to recommend.

BRIEF DESCRIPTION OF THE SEVERAL VIEWS OF THE DRAWINGS

FIG. 16 illustrates a possible set of root patch names and installed patch names which, when analyzed in accordance with the function shown in FIG. 5, produces the resultant set of patch installation recommendation triples also shown in FIG. 16.

DETAILED DESCRIPTION OF THE INVENTION

As an aid to understanding the present invention, FIGS. 10–14 present simple examples of patch tree data structures that are described in the following paragraphs.

When Hewlett-Packard's version of UNIX "HPUX," receives new program files that are to be added to a given system, the files are delivered gathered into filesets having names, such as FS1, FS2, and so on. These filesets are installed upon a given system by a process that unpacks and, possibly, uncompresses the files and places them onto the hard disk drive of that system. As in shown in FIG. 2, each fileset can contain a small or large number of files. The FILESET FS1 is shown containing the files FILE A, FILE B, . . . and FILE F. Likewise, the FILESET FS2 is shown containing the files FILE J, FILE K, . . . and FILE P. Of course, a fileset typically contains many more files than this. Some of these would be program files, some would be data files, some would be graphic image and multimedia files, depending upon the particular nature of the system and the particular nature of the programming system being installed.

Patches, or corrected/updated sets of files, are also delivered to a system as collections of filesets within each patch. In the HPUX system, it is customary that the filesets in a patch have the same names as the installed filesets. A patch fileset will contain updated versions of some (possibly all) of the files in the system fileset having the same name. A given patch PATCH_5 contains new features and fixes or repairs for specific defects. Descriptions of the new features and of the repaired defects are contained in a text file that this maintained in a central database for each patch and that is searchable for words and phrases. Accordingly, a systems administrator may search through the patch text file database and locate patches that repair particular defects or add particular features.

Figure 10:
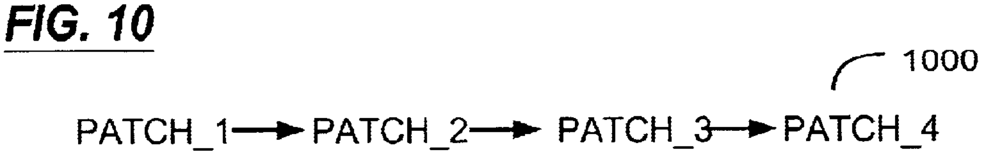
FIG. 10 presents a simple linear patch tree.

Over time, a first patch may be replaced by a second patch which contains all the fixes and new features of the first patch plus additional changes. These additional changes are called incremental fixes. The new patch then SUPERSEDES the previous patch. With reference to FIG. 10, the PATCH_4 at the root of the patch tree 1000 supersedes all of the three patches to the left in this simple linear search tree. Historically, the first patch created was PATCH_1. It was superceded by PATCH_2, which was later superceded by PATCH_3, and that patch was later superceded by PATCH_4 which now resides at the root of the patch tree 1000.

Figure 4:
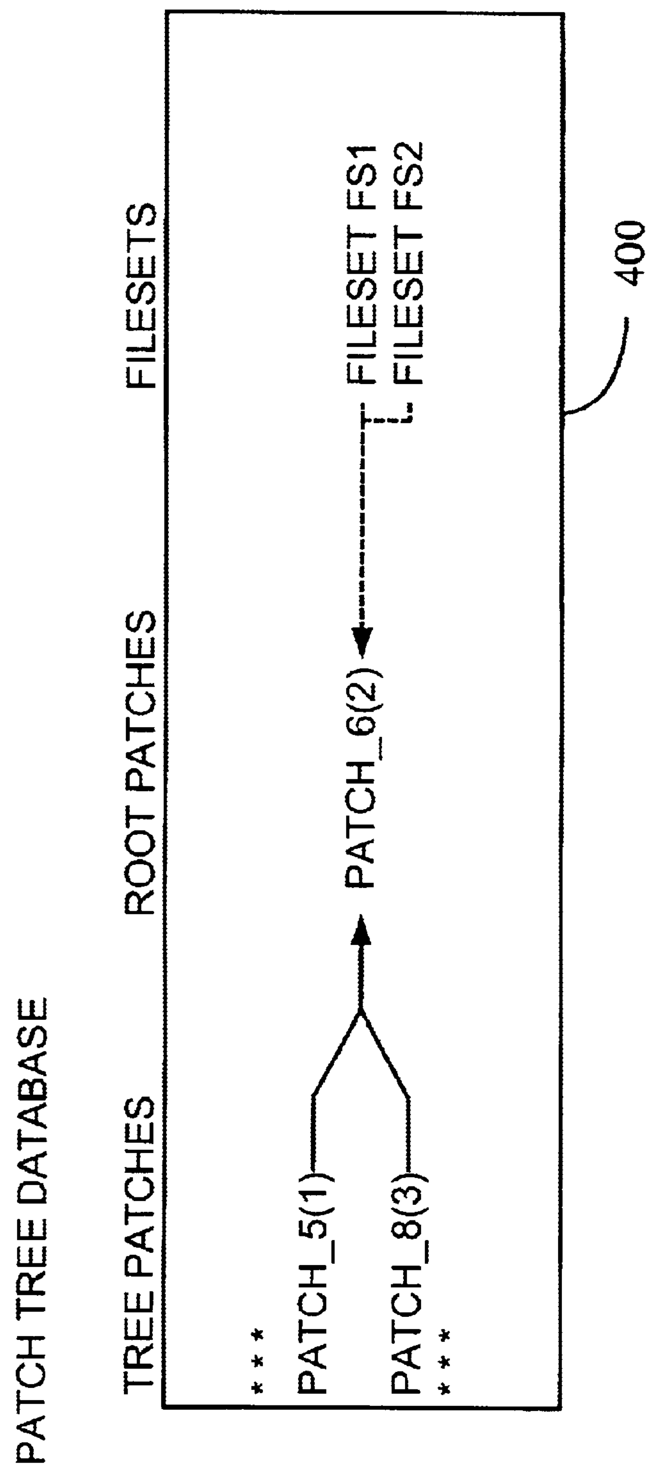
FIG. 4 presents the database structure of a patch tree database showing the root patch for each patch tree, the filesets that each patch tree modifies, and the non-root patches within the branches of each patch tree.
Figure 11:
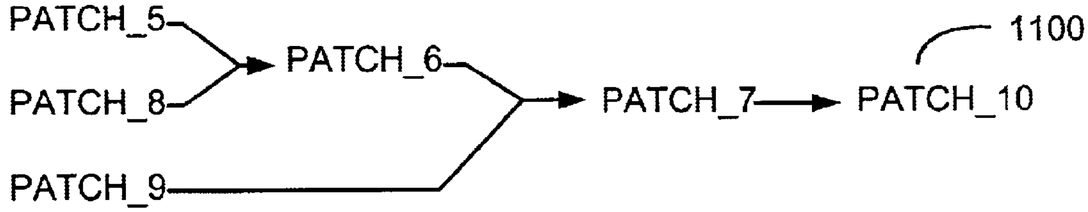
FIG. 11 presents a more complex patch tree with several branches.

In some situations, as illustrated in FIG. 11 at 1100 and also in FIG. 4 at 400, two or more patches will be replaced by a single patch. Thus, PATCH_6 SUPERSEDES both the patches PATCH_5 and PATCH_8. This is represented in the search tree by PATCH_6 forming the root of a sub-tree having the two branches PATCH_5 and PATCH_8. Referring now to FIG. 11, the same patch tree shown in FIG. 4 is shown at a later point in time. At some point in time, a new patch PATCH_9 was added which was not part of the original patch search tree but which initially formed a single isolated patch search tree having only one patch element. Then a new patch PATCH_7 was created which combined all of the updates and changes contained in the patches 5, 6, 8, and 9. Even later on, that patch was superceded by a new patch PATCH_10, thus forming the patch tree 1100 shown in FIG. 11. The root patch in the patch tree 1100 is the PATCH_10. That patch and PATCH_7 form the trunk of this searchable patch tree, which then branches into two branches, one containing PATCH_9 and another containing PATCH_6; and the PATCH_6 branch of the tree then branches again into the two patches PATCH_5 and PATCH_8. As can be seen, a patch tree can become quite elaborate over time as many patches are combined into a smaller number of newer patches. When placed into a patch tree database, as shown in FIG. 4, a patch tree can be searched in an automated manner, as will be explained.

Figure 12:
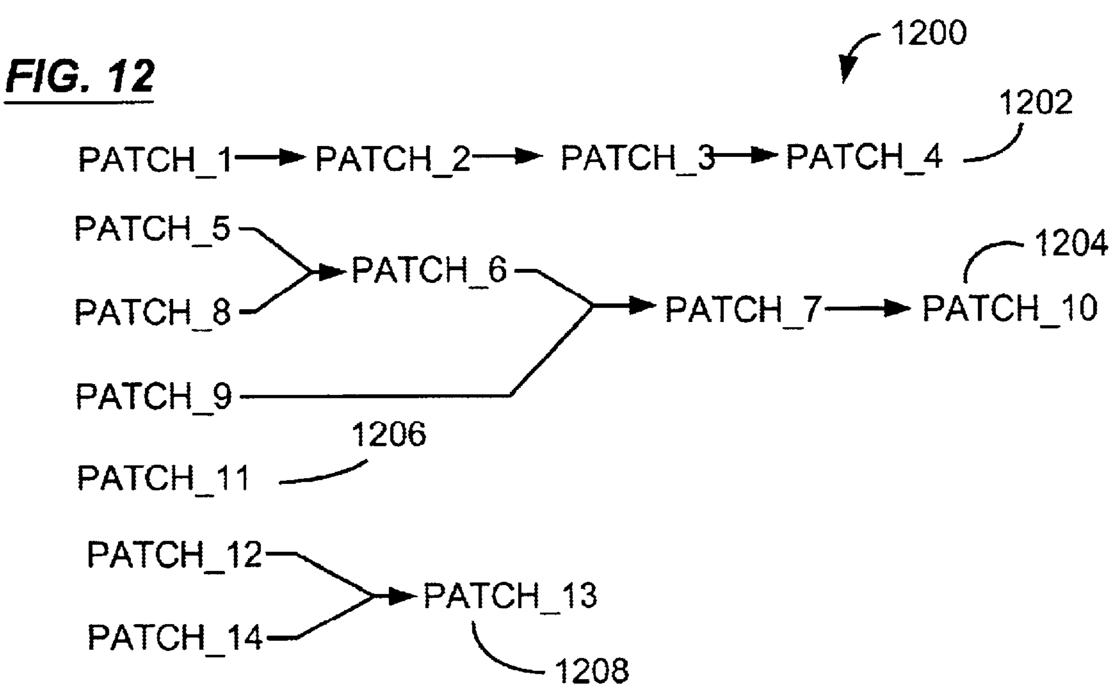
FIG. 12 presents a set of four patch trees, two of which have branches.

Typically, large systems will contain large numbers of filesets, and these will be updated by the patches in multiple disjoint patch trees (i.e., a patch will appear in at most one tree). Accordingly, FIG. 12 illustrates a possible set of four patch trees 1202, 1204, 1206, and 1208 all comprising a set of patches 1200 that are used to update a given system. The set of patch trees shown in FIG. 12 is selected by first determining what filesets a given system contains and by then, with reference to a patch tree database such as that shown at 400 in FIG. 4, selecting the root patches for all the patch trees that contain filesets having the same names as the system filesets.

Figure 1:
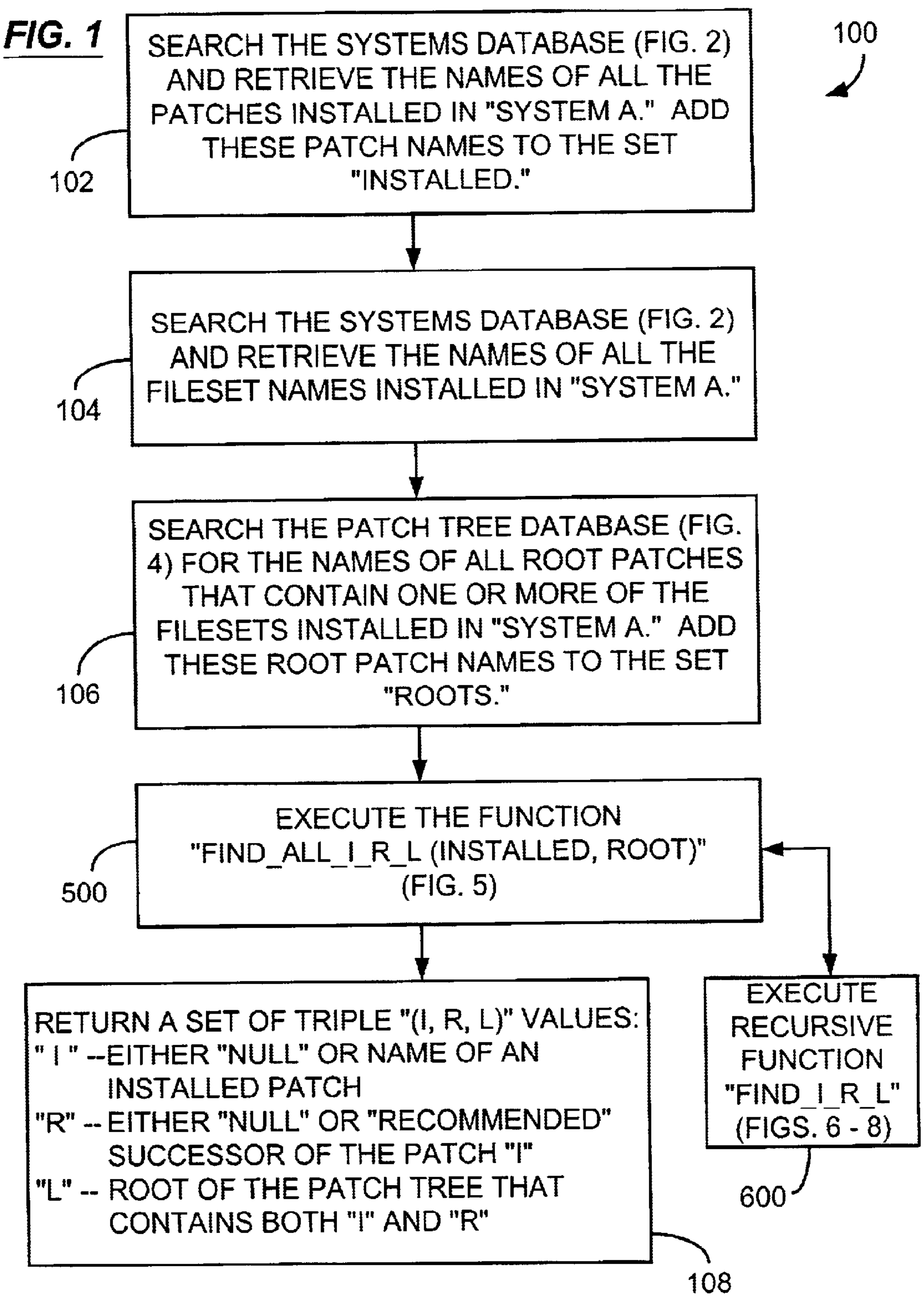
FIG. 1 presents an overview block diagram of the patch selection method of the present invention.

The beginning point for the patch selection method of the present invention is the determination, at steps 104 and 106 in FIG. 1, of the names of all the root patches that contain filesets whose names correspond to the names of a given system's filesets. These fileset names are first retrieved from a systems database 200 (FIG. 2), and the same fileset names are then located in the fileset column of a patch tree database 400 (FIG. 4). The names of the root patches for the corresponding patch trees are then obtained from the root patches column of the patch tree database 400 shown in FIG. 4. The root patch names are then combined as a set and are stored together as a set variable named ROOTS. The set variable ROOTS is adjusted to contain, as set elements, the names of the root patches (PATCH_6, for example) which the patch tree database 400 links to the fileset names, such as FILESET FS1 and FILESET FS2, that are also the names of the filesets for a given system. Alternatively, file names could be used instead of fileset names for this purpose.

Figure 3:
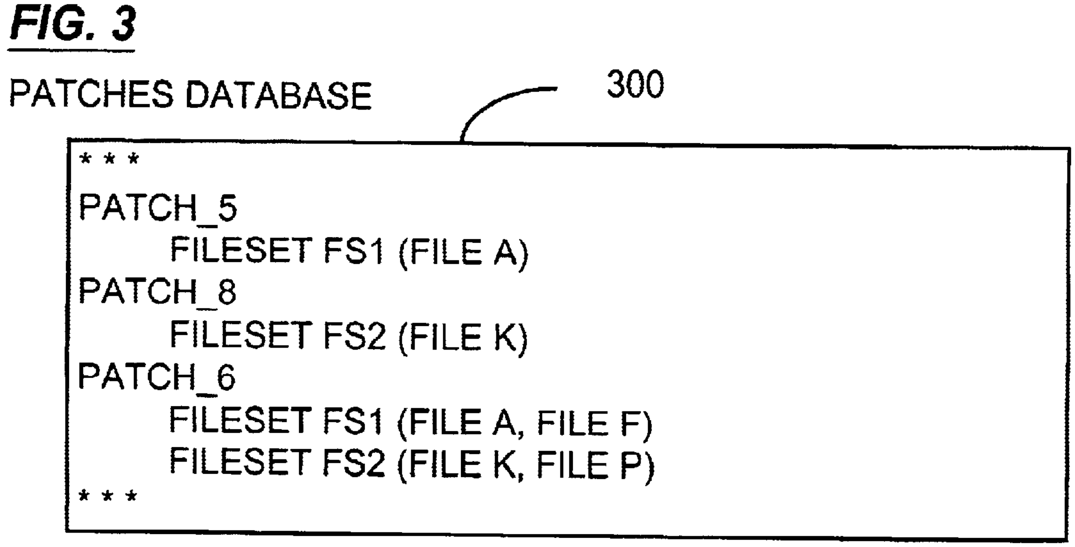
FIG. 3 presents the structure of a patches database that indicates what filesets each patch corrects and which files within those filesets the patches repair or modify or both.

The patch tree database 400 can be constructed from a patches database 300 (FIG. 3) that shows what fileset names and what files each patch contains, as well as the creation date for each patch. This database 300 can be generated from the uncompressed patches themselves in an automated fashion, if desired.

Figure 2:
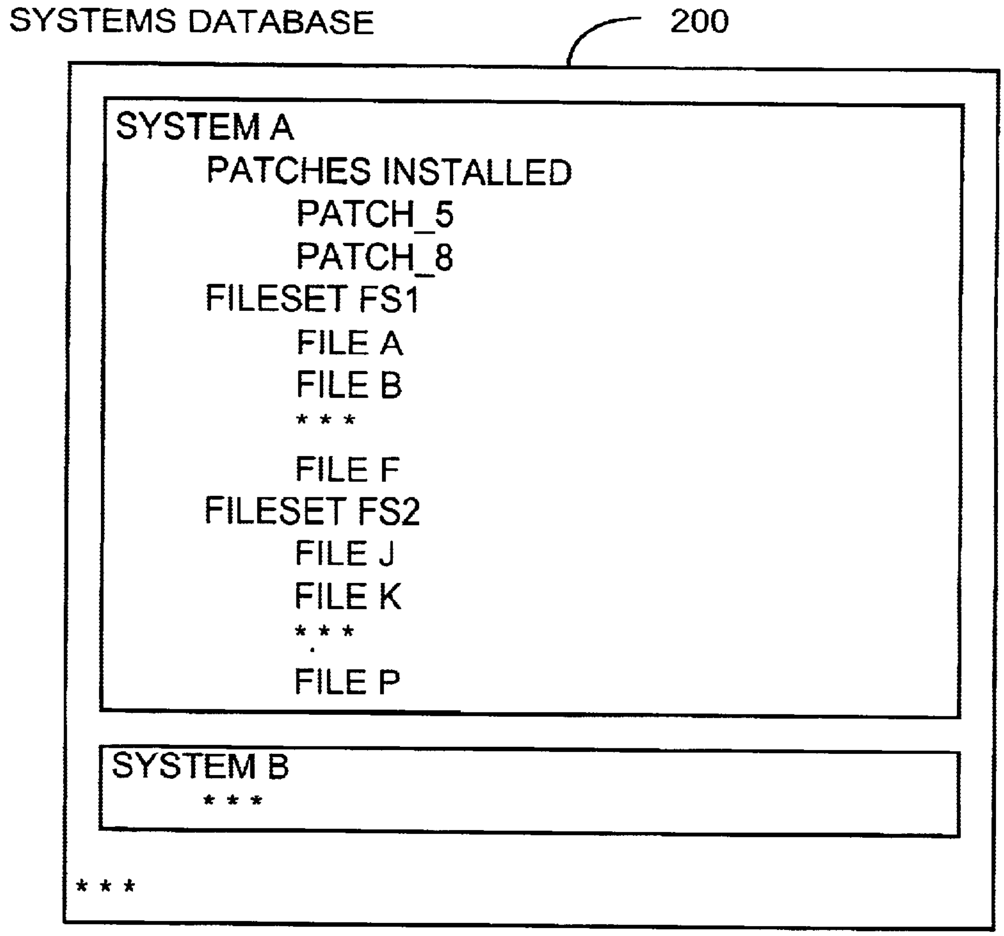
FIG. 2 presents the structure of a systems database that indicates which files, which filesets, and which patches are installed on each system.

The second step needed at the start of the patch selection method of the present invention is to determine which update patches a given system has already received. With reference to FIG. 2, a system's database 200 contains a record of the patches that have already been installed on each given system. This database can be derived from the log files that are generated when a system receives new patches. Thus, the SYSTEM A is shown as having already received the patches PATCH_5 and PATCH_8. This corresponds to the step 102 shown in FIG. 1. As indicated at 102 in FIG. 1, the names of these installed patches are combined and are stored within a set variable named INSTALLED, such that each element associated with this variable is the name of a patch already installed on the SYSTEM A.

In the example illustrated by FIGS. 2 and 4, the SYSTEM A includes the two filesets FILESET FS1 and FILESET FS2 both of which filesets, according to FIG. 4, are modified by the patches in the patch tree whose root element is PATCH_6. Accordingly, in this case the system variable ROOTS is assigned the single name PATCH_6 and thus contains the name of only one patch tree. In general, as is illustrated in FIG. 12, several patch trees may be relevant to updating the filesets of a given system. Thus, if the SYSTEM B listed in FIG. 2 contains filesets whose names the patch tree database 400 associates with the set of patch trees shown in FIG. 12, then in that instance the system variable ROOTS will be assigned the four patch tree root patch name values PATCH_4, PATCH_10, PATCH_11, and PATCH_13 all of which names are retrieved from the root patches column of the patch tree database 400 in FIG. 4.

Having found the names of all the patches previously installed in a given system, and having associated those names with the system variable INSTALLED; and having also found all of the patch tree root patch names relevant to the updating of a given system, and having associated those names with the system variable INSTALLED; the present invention now passes the two sets of values INSTALLED and ROOTS to a function entitled FIND_ALL_I_R_L (find all set of the triple values (I, R, L) for this system). As shown at step 108 in FIG. 1, this function returns a set of triple (I, R, L) values.

Each triple value returned is a recommendation of a possible way to update the system. Within each triple, the central value "R" is the name of a "recommended" patch to be installed on the system, or "R" is NULL if this triple contains no recommendation. This recommended patch name was retrieved from a patch tree. "L" is the name of the root (or "latest" or most recent) patch in that patch tree. "I" in each triple is the name of an already installed patch that is to be superceded by the recommended patch, or else it is NULL if there was no prior patch installed that is being superceded.

A conservative user will take the name values R, obtain the correspondingly named patches, and install them to update a given system. A user who is not concerned about risks and wants to receive the very latest updates can, instead, take the name values L and install them upon a given system. A very conservative user, after taking the name values R, might then obtain the text files describing the recommended patches R and review what those patches do, and then select only those recommended patches containing changes that are important to that particular user, thereby avoiding the possibility of introducing new problems along with new patches in areas that are irrelevant to a particular user's needs.

Figure 5:
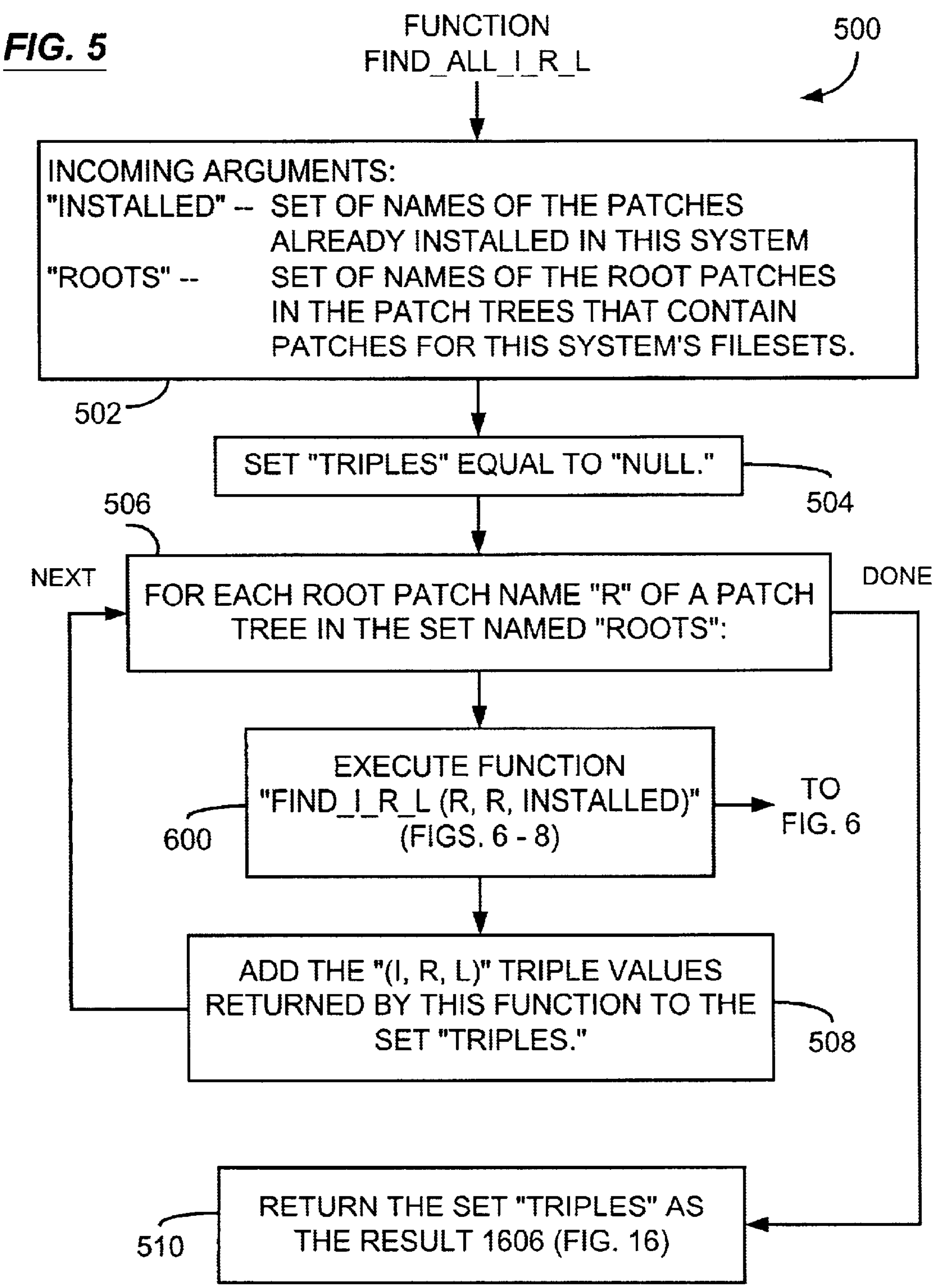
FIG. 5 presents a flow diagram of a function which, given a list of the names of patches already installed on a system and a list of the names of the root tree patches for the patch trees that contain modifications to the filesets of the system, returns a list of recommended new patches for the system in the form of triples.

The call to the function FIND_ALL_I_R_L performed at step 500 in FIG. 5 is drawn to indicate that that function 500 calls a second function FIND_I_R_L 600 to search each individual patch tree, and the function 600 recursively calls itself as needed to examine each patch within each tree. By "recursive," it is meant that this latter function 600 calls upon itself one or more times in the course of searching right-to-left through complex patch trees, examining earlier patches, and determining whether they should be superceded by later patches or whether, due to the low ratings of the later patches, the earlier patches should be utilized instead or retained.

A user with a particular system is looking for patches that will bring their system up-to-date. With the possibility of different patch ratings for different patches on the same patch tree, the problem arises as to which patch is the most appropriate to be recommended to a given user. The recommendation depends on the amount of risk that a particular user is willing to accept.

The patch selection algorithm, presented in overview in FIGS. 5-9 and in detail in the Appendix to this application, creates a set of recommended patches for the user given a particular patch search space of patch trees and a given description of the patches already installed on a user's system. The recommended patches typically have higher ratings, and thus they introduce minimal additional risk to the user. The recommended patches are represented as sets of triple I, R, L values, as was just explained. The following definition forms the basis for determining whether users should install a given patch R on top of an already installed patch I. This definition is conservative—selecting a successor patch only if it is highly tested, or if it is at least more tested than a currently-installed patch.

Consider two patches I and R, where R is a successor to I. R is considered "clearly better" than I if and only if:

The rating of R is greater than the rating of I, or

The rating of R is 3.

Figure 14:
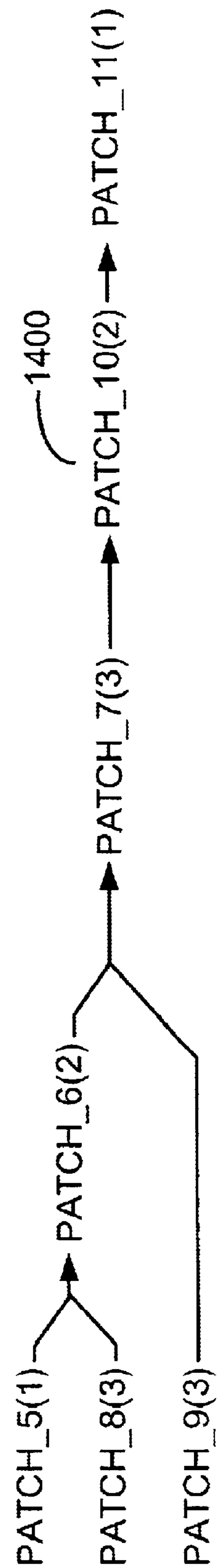
FIG. 14 illustrates the patch tree shown in FIG. 13 at a later time, with a new root patch and with the ratings updated to reflect a new patch and further usage and testing.

Consider the exemplary patch tree shown in FIG. 14. In this example, the following conclusions may be drawn:

PATCH_6 is clearly better than PATCH_5 but not PATCH_8.

PATCH_7 is clearly better than PATCH_9.

PATCH_10 is clearly better than PATCH_5 but not PATCH_6.

The following definition makes a patch recommendation from all of the "clearly better" patches. The definition will only recommend less risky patches by selecting patches with a rating of at least 2. The most recent, highest rated patches are selected. Note that the definition still applies when the patch tree contains no installed patches.

Definition of "recommended." A patch R is recommend if and only if:

1. R has a rating of at least 2.
2. There are no successors to R with higher or equal ratings.
3. There are no successors to R which are already installed.
4. If R is a successor to some set of installed patches, then R is "clearly better" than at least one of them.

Figure 13:
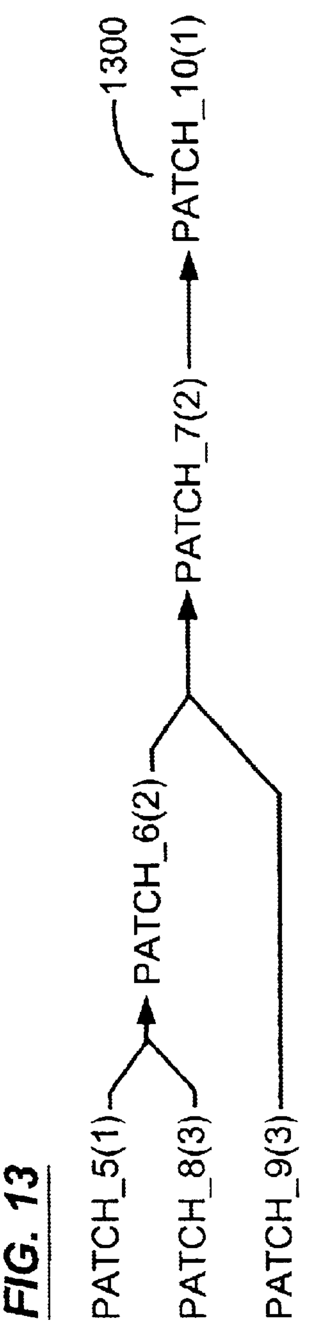
FIG. 13 illustrates a patch tree in which the patches have ratings assigned to them.

Consider the example set forth in FIG. 13.

If no patches are installed, the recommended patches are PATCH_8 and PATCH_9.

If PATCH_5 and PATCH_9 are installed, PATCH_7 is recommended.

The present invention is implemented by means of a program 500 (FIG. 5) named FIND_ALL_INSTALLED_RECOMMENDED_LATEST or, as depicted in the drawings, FIND_ALL_I_R_L. This program 500 is implemented as a function returning sets of triples or triple values. A brief explanation of the returned sets of triple values is presented at step 108 in FIG. 1, and was explained above. The calling parameters passed into this function are explained at 502 in FIG. 5. The assembly of these calling parameters is illustrated in FIG. 1 in the steps 102, 104, and 106 which lead up to calling this function at step 500, which steps were explained above.

Figure 6:
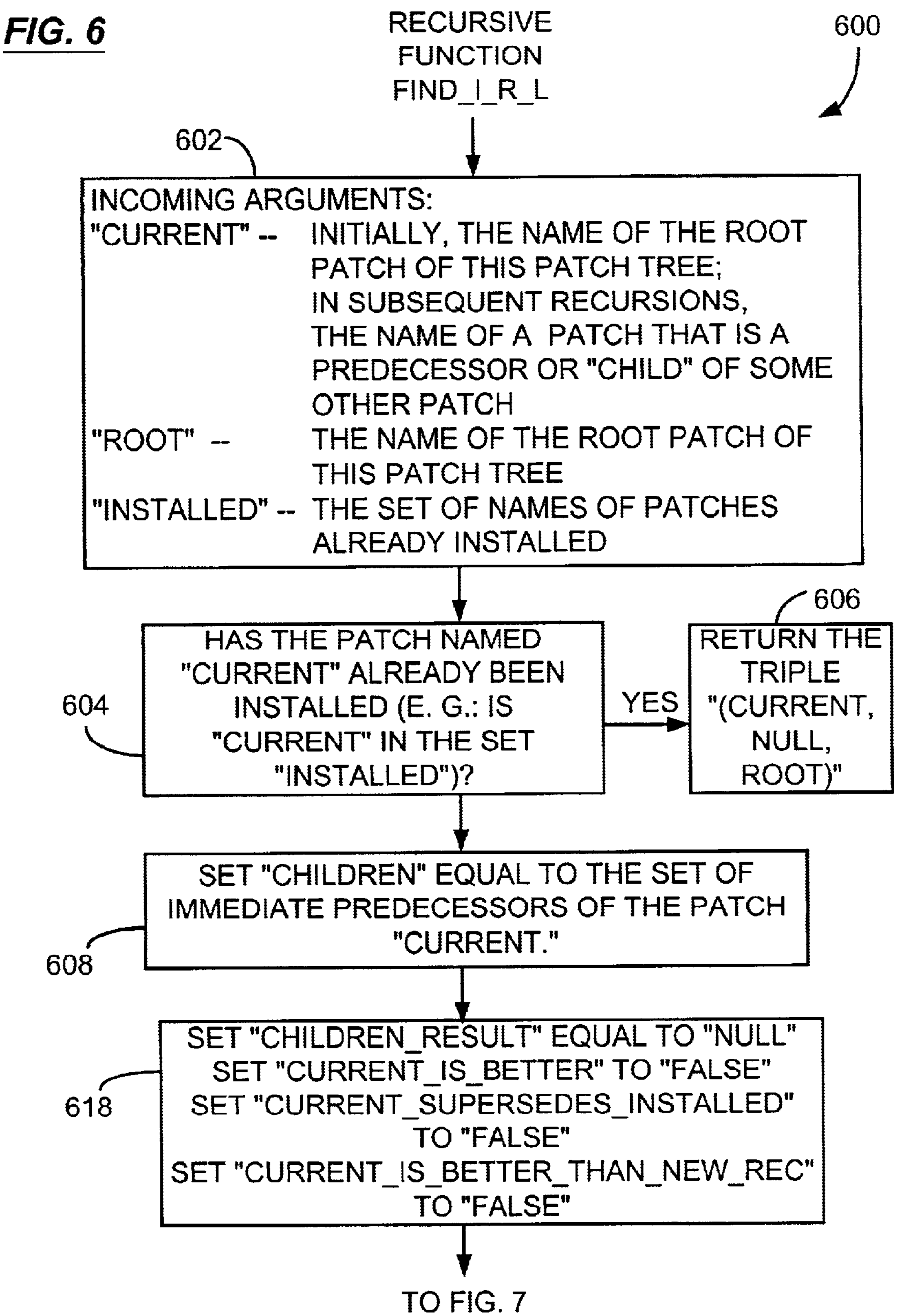
FIG. 6 presents a flow diagram of a recursive function that is called by the function shown in FIG. 5 to trace recursively through the individual patch trees and sub-trees searching one tree or sub-tree during each recursion, to find recommended patches for system update.
Figure 7:
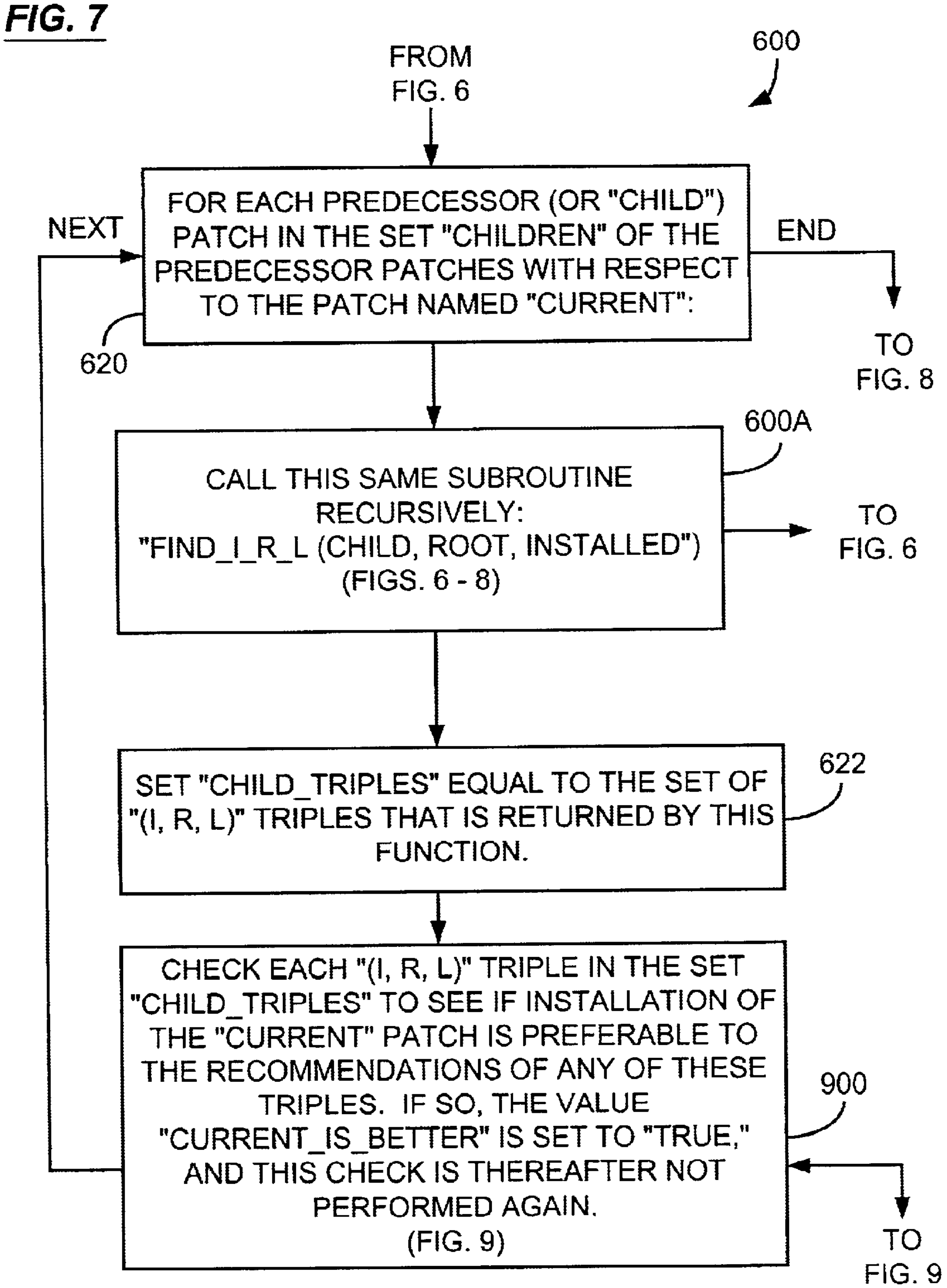
FIG. 7 is a continuation of the flow diagram of FIG. 6.
Figure 8:
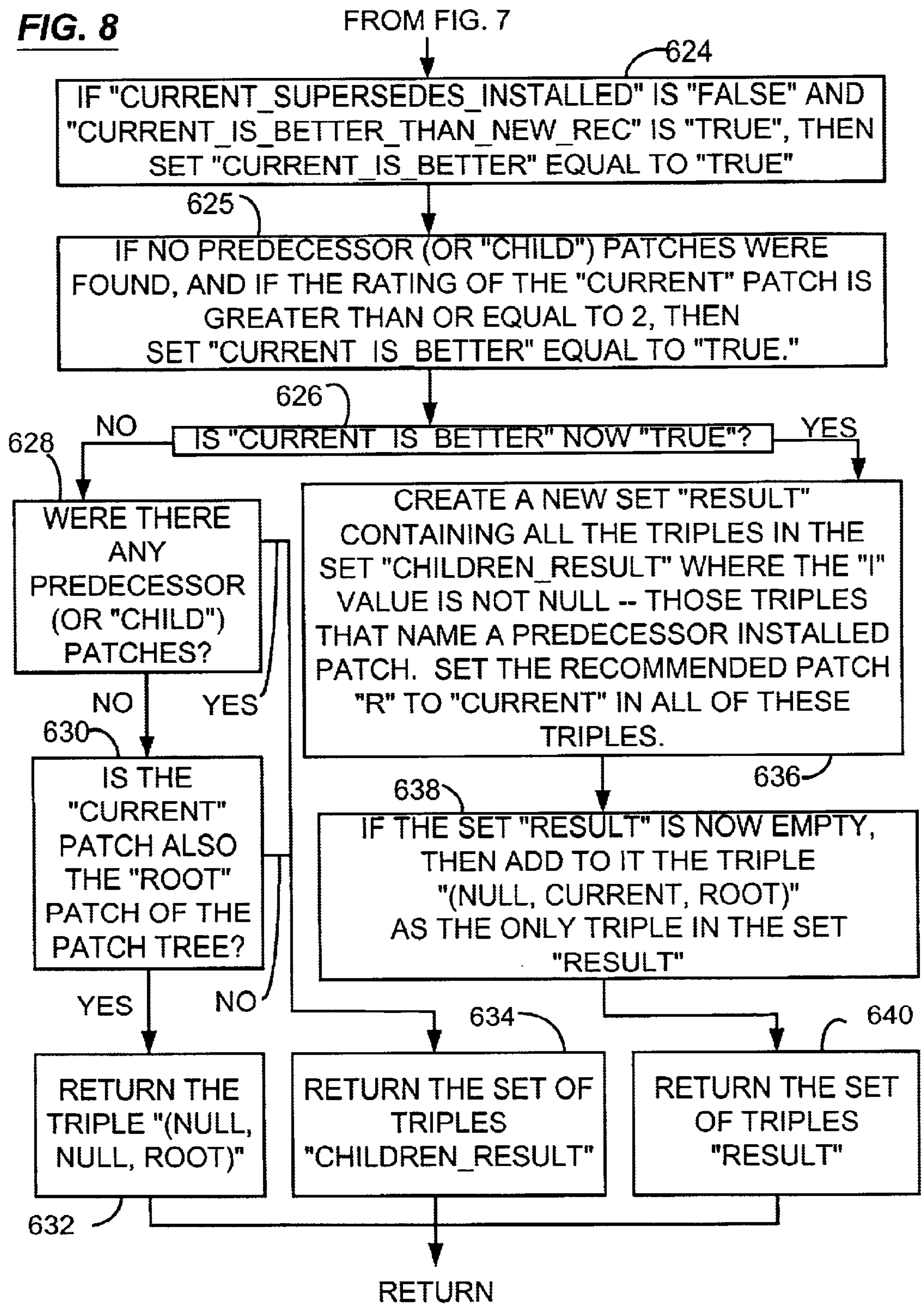
FIG. 8 is a continuation of the flow diagram of FIGS. 6 and 7.
Figure 9:
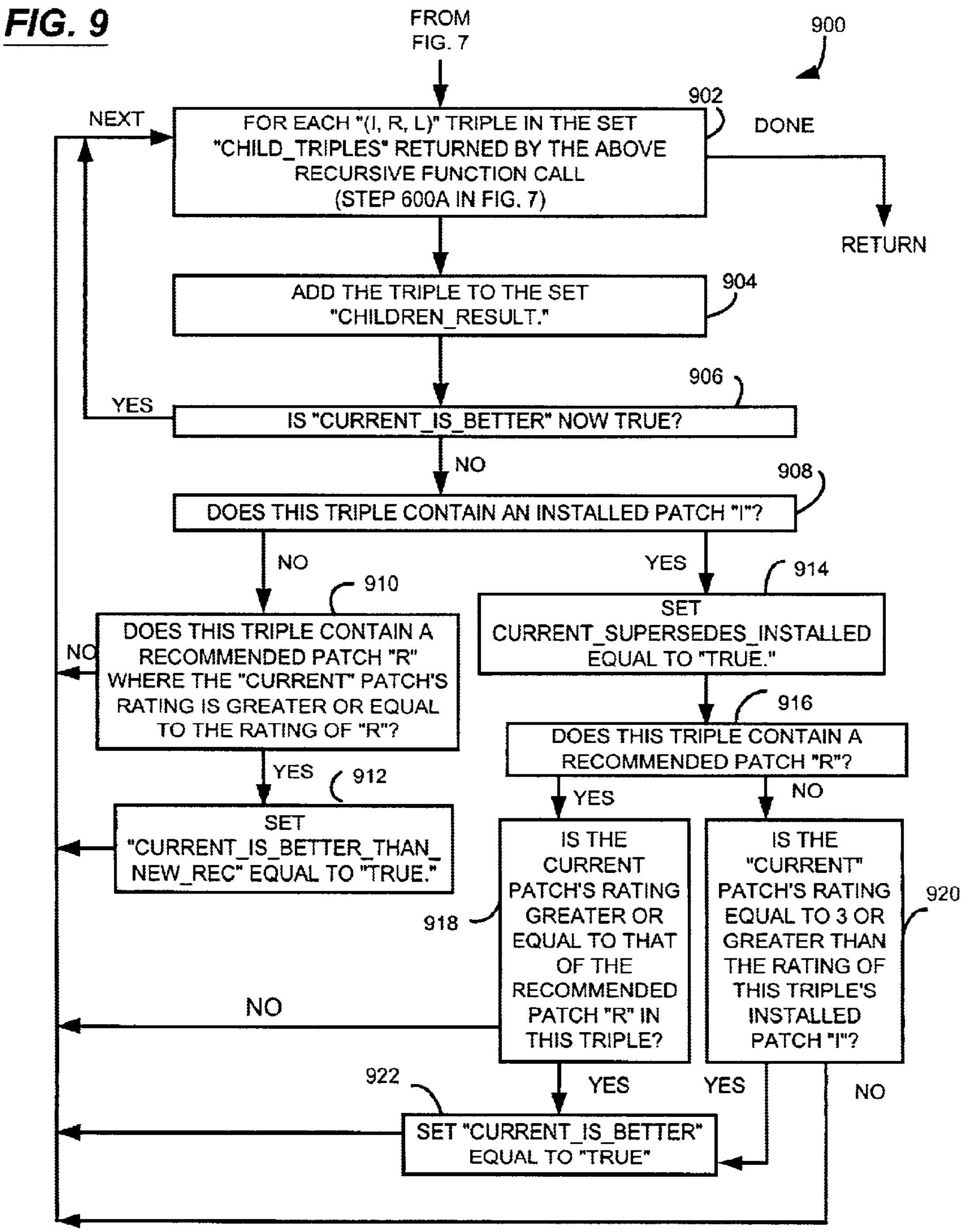
FIG. 9 is a subroutine that determines whether the patch at the root of a given sub-tree is a better choice than at least one of the patches in that sub-tree's branches.

As illustrated in FIG. 1, the function FIND_ALL_I_R_L 500 works by recursively calling a secondary recursive function FIND_I_R_L 600 that is shown in the FIGS. 6–8 (with the entry point being the step 602 in FIG. 6) and which calls upon a subroutine 900 that is shown in FIG. 9. A complete pseudo-code listing of all of these programs is presented in the Appendix of this application. The functions presented in the Appendix are fully described and explained by the flow diagrams presented in the FIGS. 5–9.

Figure 15:
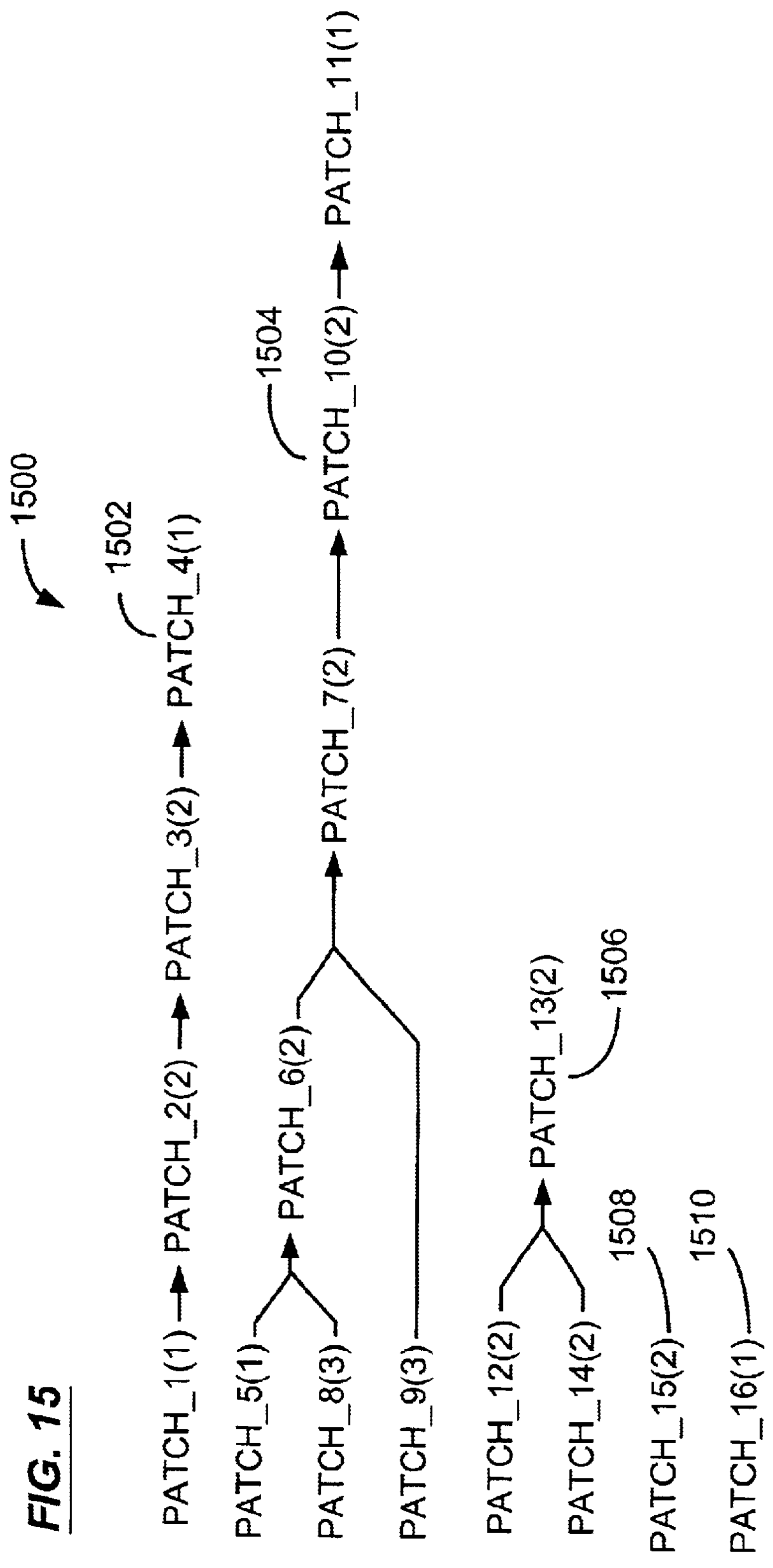
FIG. 15 presents an illustrative set of patch trees.

FIGS. 15 and 16 illustrate the use of the invention to select patches from a set of patch trees 1500 that are shown in FIG. 15. Five patch trees 1502, 1504, 1506, 1508, and 1510 are shown in FIG. 15. Each patch tree is identified by the name of the root, or most recent, patch, which appears to the right in FIG. 15. Thus, the patch tree 1502 is identified by the patch name PATCH_4, the patch tree 1504 is identified by the patch name PATCH 11, and so on.

In this example, the set variable INSTALLED, shown at 1604 in FIG. 16, contains the names of all the patches that have already been installed on a hypothetical system. The set variable ROOTS shown at 1602 contains the names of the root patches of the five patch trees 1500 shown in FIG. 15. These values are gathered by performing the steps 102, 104, and 106 shown in FIG. 1, as has been explained. After execution of the function at 500, which calls the recursive function 600, the results of the patch analysis are returned (step 108 in FIG. 1) as a set of six triple values which are shown collectively at 1606 in FIG. 16 to include the individual triple values 1608, 1610, 1612, 1614, 1616, and 1618. By considering the above rules, and by examining the tree structures shown in FIG. 15, as well as the set variables ROOTS 1602 and INSTALLED 1604, it can be seen how these triple values were produced.

Briefly summarized, the triple 1608 recommends that PATCH_1 be replaced by PATCH_3. In the patch tree 1502, PATCH_3 which is newer and more reliable than PATCH_1; while the PATCH_4 is still newer, it is not recommended because of its unreliability.

The triple 1610 similarly recommends the installation of the new PATCH_10 to replace the PATCH_5, but it does not recommend installation of the still newer but unreliable PATCH_11. The similar triple 1612 recommends that the same PATCH_10 also replace the previously installed PATCH_9, even though PATCH_10 is less reliable than PATCH_9, since PATCH_10 has already been recommended to replace the even less reliable PATCH_5.

A triple 1614, which relates to the patch tree 1506, does not recommend that the newest PATCH_13 replace the previously installed PATCH_14 because they both have a reliability rating of 2 and therefore PATCH_13 is not "clearly better" than PATCH_14. This triple 1614 contains a recommendation of NULL.

The triple 1616 suggests that the PATCH_15, with a rating of 2, be installed. The NULL value in this triple indicates that no previous patch has been installed.

The triple 1618 recommends against installing the single PATCH_16, since it has an unacceptable reliability rating of 1.

As can be seen in the set of triples shown at 1606 in FIG. 16, the first value of each triple, identified by the letter I, is either a NULL value, or it is the name of a patch that was previously "installed" and that is now being replaced by whatever recommendation is made. The middle value, assigned the letter R, is NULL if no recommendation is being made for a replacement, or it is the name of a "recommended" replacement patch. The third value, identified by L, is the name of the "latest" patch—the one most recently added to the patch tree that contains both the patches I and R. If that latest patch is rated highly and is reliable, it is the choice in every case. That last patch is bypassed simply to give better system stability and reliability at the sacrifice of new features that might have been added by the latest patch. The field engineer, after viewing the text file describing the features that may have been added to the patches, may choose to override the recommendations and go with the latest patch, the one that appears to the right in the patch tree and in each triple, depending upon the needs of a particular system.

FIG. 5 presents a block diagram description of the function 500 named FIND_ALL_I_R_L, which is an abbreviation for the function name FIND_ALL_INSTALLED_RECOMMENDED_LATEST that appears in the Appendix. Given a set of patch trees (FIG. 4, 12, or 15) relevant to a given system and given a list of the names of the patches already installed on that system, this function produces a series "triples" of recommended patch updates each of which includes the name L of the "latest" patch in a patch tree set, the name R of a recommended patch, and the name I of an installed patch that is to be superceded. The above paragraphs have described the triples 1606 (FIG. 16) returned in a given exemplary situation.

With reference to FIG. 5, the first step 502 simply describes the incoming arguments passed to this function by the calling program 100 which appears in FIG. 1 and was discussed above. The set variable INSTALLED contains the names of the patches that have already been installed in the system that is to be upgraded. The set variable ROOTS contains the names of the relevant root patches of the patch trees that contain patches relevant to this system's filesets, as was explained above.

The function 500 begins at step 504 by setting the set variable TRIPLES equal to NULL. This variable TRIPLES is the return argument which, at step 510, returns the recommendations, as described at 108 in FIG. 1 and as illustrated at 1608–1616 in FIG. 16, to the calling program 100 in FIG. 1.

Beginning at step 506, this function 500 begins to loop through the steps 506, 600, and 508. Each time through this loop, a temporary variable R is set to the name of one of the patch tree root patch names that is retrieved from the set variable ROOTS. Each time through this loop, the re-enterable function FIND_I_R_L 600 is called and is passed, as the first two of its three incoming arguments, two copies of this variable R which contains the name of the root patch in a patch tree. The third incoming argument is the variable INSTALLED which contains the names of all the installed patches.

At step 508, any triple values returned by a given call to the function 500 are added to the variable set TRIPLES and are thus preserved to be returned by the function 500 to the calling program 100 when the function 500 terminates execution at step 510. Accordingly, each relevant patch tree is analyzed independently by a call to the function 600, the details of which appear in FIGS. 6–9. That function 600 begins at the root of a patch tree and, by means of recursive calls to itself, moves up the patch tree one step at a time, evaluating every patch in the tree one patch at a time, each patch being evaluated by a separate recursive call to the same function.

Referring now to FIG. 6, the recursive function FIND_I_R_L 600 begins at step 602 in FIG. 6, where its incoming arguments are described.

Referring now to FIG. 6, the recursive function 600 has a set of three arguments passed to it, as is indicated at 602. It returns a set of triples, as indicated at 108 in FIG. 1. The incoming three arguments described at 602 include a first argument that is the name of a patch and that changes with each recursive call, and second and third arguments that never change throughout the recursive operation of the function 600, although each time the function 600 is called by the function 500, the second argument, a patch name, changes. The third argument, the set of the names of installed patches INSTALLED, remains invariant at all times.

The second argument, which is different for each call to the function 600 by the function 500 but which is invariant within recursive calls of the function 600 to itself, is the name of the patch that appears at the root of the particular patch tree that is being evaluated by the function 600 at the request of the function 500. It will be recalled that the function 500 receives these root patch names in the set variable ROOTS. The function 500 calls the function 600 repeatedly, each time varying the root patch tree name that is passed to the function 600 so that a different patch tree is evaluated by each call to the function 600.

The first argument, CURRENT, is the one that varies with each recursive call of the function 500. Assume, for example, that the function 500, at step 600, is calling upon the recursive function 600 to evaluate the patch tree 1504 shown in FIG. 15. The initial call of the function 500 to the recursive function 600 will set both the value ROOT and the value CURRENT to the name of the that patch tree 1504's root patch, PATCH_11. Thus, the function 600, before it begins to call itself recursively, is asked to evaluate the CURRENT patch name PATCH_11 in the patch tree having the root patch name PATCH_11. The function 600 proceeds to FIG. 7 where, at step 600A, the function 600 calls itself recursively, this time passing to itself as the incoming argument CURRENT the name of the patch PATCH_10 which is the immediate predecessor (or CHILD) of the root patch named PATCH_11, as can be seen in the patch tree 1504. The recursive function call begins again at the step 602 with the value CURRENT equal to the patch name PATCH_10, and it proceeds again to FIG. 7, step 600A, where the subroutine 600 again calls upon itself recursively, this time to evaluate the next predecessor (or CHILD) patch named PATCH_7. Again the function 600 commences at step 602 with CURRENT equal to PATCH_7 this time, and program control proceeds again to FIG. 7, step 600A, where the same subroutine 600 is now recursively called twice during two successive passes through the loop defined by the series of steps 620, 600A, 622, and 900. During each pass through this loop, a different predecessor (or CHILD) patch of the patch named PATCH_7 in the patch tree 1504 is evaluated. Two passes are required because there are two predecessor patches, one named PATCH_6, and another named PATCH_9. And in a like manner, when the function 600 is recursively called upon with CURRENT set equal to the name PATCH_6, program control again proceeds to FIG. 7, step 600A, and the function again calls itself recursively twice to evaluate the two predecessor (or CHILD) patches in the search tree 1504 relative to the patch named PATCH_6—the patches PATCH_5 and PATCH_8.

In brief summary, it can be seen that each of the patches whose name appears in the patch tree 1504 is individually evaluated, and each such evaluation involves a recursive call to the function 600 with the CURRENT patch set to the name of the particular patch that is being evaluated during this call to the function. During these calls, the ratings of the various predecessor patches contained in the triples returned from the recursive calls, are studied and compared by further recursive calls to the rating of the CURRENT patch, and decisions are made as to which should be the recommended patches to present in the list of triples 1606 (FIG. 16) that is ultimately returned by the main calling function 500 to the step 108 in FIG. 1.

Having thus described an example of how the functions 500 and 600 operate upon specific data, and having explained the recursive nature of the function 600 and what it does, it now remains only to describe the details of the function 600, as presented in FIGS. 6–9, during any one of these recursive executions. In the paragraphs that follow, the function 600 is presumed to have been called upon, either by itself or by the function 500, to study specifically a patch whose name appears in CURRENT and its predecessor (or CHILD) patches in a patch tree or sub-tree. This study is conducted with due regard to the previously-installed patches whose names are included in the set variable INSTALLED, and this study focuses upon the patch tree whose root patch's name is contained in the variable ROOT.

Beginning at step 604, a test is made to see if the patch whose name appears in CURRENT has already been installed and thus appears in the array of patch names INSTALLED. If so, then there is no point in examining any predecessor (or CHILD) patches, since the system has already been updated beyond those predecessor patches. Accordingly, program control continues at step 606 where the single triple value CURRENT, NULL, ROOT is returned to the calling program. This says to the calling program that the patch name CURRENT is an installed patch, that there is no recommended replacement patch, and that the program which called the routine 600 should proceed with that as its only information concerning the remainder of the patch tree or sub-tree to the left of the patch CURRENT.

Assuming that the patch whose name appears in CURRENT has not been installed, then the function 600 proceeds to evaluate any predecessor (or CHILD) patches relative to the CURRENT patch. First, at step 608, the function 600 accesses the patch tree database 400 shown in FIG. 4, finds the patch tree having the root patch name that is stored in ROOT, searches the patch tree for the patch whose name appears in CURRENT, and then searches further to the left into the branches of the patch tree to find whatever number of immediate predecessor (or CHILD) patches may exist for the patch CURRENT. This set may contain no patches, one patch, or several patches. For example, the patch tree 1504 shown in FIG. 15 reveals that the patch named PATCH_9 has no predecessor (or CHILD) patches. If PATCH_9 is the CURRENT patch, the local set variable CHILDREN is set equal to a NULL value at step 608. On the other hand, the patch named PATCH_10 has one predecessor (or CHILD) patch, the patch that is named PATCH_7. Thus, if PATCH_10 is the CURRENT patch, the set variable CHILDREN is set equal to the single name PATCH_7. But if the CURRENT patch is the patch named PATCH_7, it can be seen that this patch has two predecessor (or CHILD) patches, the patches PATCH_6 and PATCH_9. Accordingly, if PATCH_7 is the CURRENT patch, the set variable CHILDREN would contain only the two patch names PATCH_6 and PATCH_9.

Next, at step 618, four variables also local to each recursion of the function 600 are initialized. A set variable CHILDREN_RESULT, which is used to recollect and store the triples (see step 108 in FIG. 1) returned by recursive function calls to the function 600, is initialized to the value NULL to signify that no triples have yet been found. Following each recursive call to the subroutine 600, any new triple values found are added to this set CHILDREN_RESULT.

Another function variable CURRENT_IS_BETTER is initially set to the Boolean value FALSE. This is a flag which determines whether the patch whose name is in CURRENT is the best and recommended choice for installation, such that it should be recommended in lieu of any predecessor (or CHILD) patches (to the left of the patch CURRENT in the patch sub-tree starting with the patch CURRENT) in all of the triples that are returned by this particular recursive call to the function 600. That is what happens if, after the function 600 nears completion of its run, and has completed all of its recursive calls to itself, this flag is found to be set TRUE. On the other hand, if after analyzing recursively all of the predecessor (or CHILD) patches, the flag CURRENT_IS_BETTER is still found to be set FALSE, that means there are no patches which are predecessor (or CHILD) patches with respect to the patch CURRENT that are worse candidates for installation than the patch CURRENT. In that case, all of the triples that result from further recursive calls of the function 600 to itself to analyze the predecessor (or CHILD) patches are preserved and are simply passed back as return arguments from this particular recursion of the function 600, as will be seen.

Another function variable CURRENT_SUPERSEDES_INSTALLED is initially set to the Boolean value FALSE. This is a flag which will be set to TRUE if any triple returned from any recursive call to the function 600 for any predecessor (or CHILD) of the patch CURRENT contains the name of a patch in the installed component of the triple. This flag will have a value of TRUE if any of the predecessors of CURRENT are in the set of INSTALLED patches. A value of TRUE will indicate that the CURRENT patch can only be recommended if it has a rating of 3 or a rating greater than the rating of at least one of the installed predecessors.

Another function variable CURRENT_IS_BETTER_THAN_NEW_REC is initially set to the Boolean value FALSE. This is a flag which will be set to TRUE if any triple returned by any recursive call to the function 600 for any predecessor (or CHILD) of the patch CURRENT, contains NULL for the installed patch and a recommended patch who's rating is less than or equal to the rating of CURRENT. If the value of CURRENT_SUPERSEDES_INSTALLED is FALSE and the value of CURRENT_IS_BETTER_THAN_NEW_REC is TRUE then CURRENT becomes the patch recommended for installation used during the creation of the returned triples.

Continuing with the detailed description of the function 600, FIG. 7 describes the looping portion of the function 600, which recursively calls the function 600 itself (step 600A) to evaluate each and every predecessor (or CHILD) patch of the CURRENT patch, as well as the predecessors of those predecessor patches out to the ends of the patch trees. At step 620, a predecessor (or CHILD) patch is selected from the predecessor set CHILDREN. Its name is assigned to the variable CHILD. At step 600A, the function 600 is called recursively, and this time the CURRENT patch, the first argument passed to the function 600 called recursively, is the patch CHILD that was just selected. The values ROOT and INSTALLED remain unchanged and are passed to all of the recursive calls to the function 600. The recursively called function may return 0, 1, or several triples of the kind described at step 108 in FIG. 1. These are collected and are stored as the value of the set variable CHILD_TRIPLES at step 622. Next, the step 900, the details of which are shown in FIG. 9, begins examining each of the triples returned by the recursive call of the function 600. This examination, briefly summarized, searches for a triple with a non-NULL installed value indicating the flag CURRENT_SUPERSEDES_INSTALLED should be set to the value TRUE.

Additionally triples with Non-NULL installed patches are examined to determine if CURRENT would be a better recommendation than the patch currently recommended in the triple. If the triple contains no recommendation, determine if CURRENT is a good recommendation for the installed patch in the triple. Only one such triple needs to be identified to warrant setting the flag CURRENT_IS_BETTER to TRUE.

Additionally triples with no installed patch specified which contain a recommended patch are examined to determine if CURRENT is a better recommendation than the recommendation in the triple. If such a triple is found the value of CURRENT_IS_BETTER_THAN_NEW_REC is set to TRUE.

Briefly summarized, this setting of the CURRENT_IS_BETTER flag causes all the triples generated by this particular operation of the function 600 to recommend the installation of the CURRENT patch, rather than some predecessor patch. In addition, once the CURRENT_IS_BETTER flag is set true, the checking process carried about by the step 900 is no longer needed and is essentially terminated for subsequent loops through the steps 620, 600A, 622, and 900 in FIG. 7.

When all of the predecessor (or CHILD) patches have been checked in FIG. 7, program control moves on to FIG. 8 where some final processing steps are carried out before operation of the function 600 terminates.

First at step 624, if no predecessor (or child) patch has been found to be installed and therefore the value of CURRENT_SUPERSEDES_INSTALLED is FALSE and the rating of CURRENT is greater than or equal to the rating of at least one recommended patch appearing in a triple resulting from a recursive call to function 600 (and therefore the value of CURRENT_IS_BETTER_THAN_NEW_REC is TRUE), then the flag CURRENT_IS_BETTER is set equal to TRUE.

Next, at step 625, if no predecessor (or CHILD) patches have been found, then the CURRENT patch is selected as a RECOMMENDED patch if its ranking is 2 or greater. The flag CURRENT_IS_BETTER is set equal to TRUE, and this causes program control to move quickly through the steps 626, 636, 638 and 640. Nothing happens at 636, since there are no triples. At 638, a single triple value recommending the installation of the CURRENT patch is generated, and at step 640, this single triple result is returned to the calling program.

The CURRENT_IS_BETTER flag is examined at step 626. If that flag is still FALSE, then program control normally moves rapidly through the step 628 to the step 634 where the set of triples CHILDREN_RESULT is returned as a return argument from this execution of the function 600. Steps 628 and 630 check for the exceptional condition when there are no predecessor (or CHILD) patches (step 628) and the CURRENT patch is also the ROOT patch of the patch tree. In this one special case, at step 632, the triple (NULL, NULL, ROOT) is returned by the function 600. For example, this is the triple 1618 (FIG. 16) which results from the examination of the single element patch tree 1510 shown in FIG. 15. In this case no recommendation is made, since the PATCH_16 has an unsatisfactory ranking of 1. Note that had the root patch had a ranking of 2 or greater, step 625 in FIG. 8 intervenes and causes the value (NULL, CURRENT, ROOT) generated at step 638 to be returned. This is illustrated by the exemplary triple 1616 shown in FIG. 16 that corresponds to the trivial patch tree 1508 shown in FIG. 15, where the single patch PATCH_15 has a ranking of 2.

Returning to the step 626, if the flag CURRENT_IS_BETTER has been set TRUE, then at step 636, all of the returned triples are examined, and those triples that do not name a predecessor patch are discarded. The remaining triples are transferred to a new set variable called RESULT. In addition, these remaining triples are edited such that whatever recommendation they may have made is discarded and is replaced with the patch name stored as the value CURRENT such that no patch predecessor to the CURRENT patch is recommended. Next, at step 638, if all the triples are discarded and none remain, a single new triple is added to the set variable RESULT having the value (NULL, CURRENT, ROOT). In every case, the triples in the set named RESULT are then returned at Step 640.

With reference to FIG. 9, the subroutine 900 is shown which examines each of the triples in the set CHILD_TRIPLES returned by recursive function calls to the function 600 (step 600A in FIG. 7). At step 902, a triple is selected from the set CHILD_TRIPLES. At step 904, this triple is added to the set CHILDREN_RESULT which accumulates all of the triples generated during all of the recursive calls to the function 600 made during this particular operation of an instance of the function 600. The remaining eight steps 908–922 performed by the subroutine 900 only need to be carried out until a recommended or existing patch is found that is inferior to the CURRENT patch, as indicated by the CURRENT_IS_BETTER flag having been assigned the value TRUE. Accordingly, at step 906, if that flag is set to TRUE, then the remaining steps in the subroutine 900 are skipped, and program control returns immediately to the step 902 where the next triple is retrieved and examined, and this process continues until all of the triples have been examined and added to the set CHILDREN_RESULT by the step 904.

Assuming that the flag CURRENT_IS_BETTER is still false, for each triple, program control continues at step 908 where the triple is examined to see if it contains an installed patch. If it does not, then at step 910 the rating of the triple's recommended patch (if one exists) is compared to that of the CURRENT patch. If the CURRENT patch's rating is greater than or equal to that of the recommended patch, then at step 912 the flag CURRENT_IS_BETTER_THAN_NEW_REC is set equal to TRUE. Otherwise, the flag is not adjusted and in either case program control returns to step 902.

Back at step 908, if the triple did contain an installed patch, then at step 914 the CURRENT_SUPERSEDES_INSTALLED flag is set equal to TRUE. Then at step 916 the triple is examined to see if it contains a recommended patch. If it does, then at step 918 the rating of the triple's recommended patch is compared to the rating of the CURRENT patch. If the CURRENT patch's rating is greater than or equal to the rating of the recommended patch, then at step 922 the flag CURRENT_IS_BETTER is set equal to TRUE. Otherwise, the flag is not adjusted and in either case, program control returns to step 902 where the next triple is examined.

Back at step 916, if the triple did not contain a recommended patch, then at step 920, the rating of the CURRENT patch is examined. If it is equal to 3, then at step 922, the CURRENT_IS_BETTER flag is set equal to TRUE. Likewise if the CURRENT patch's rating is greater than the rating of the installed patch specified in the triple under examination, then again, at step 922, the flag CURRENT_IS_BETTER is set equal to TRUE. Otherwise the flag is not adjusted and in all cases, program control returns to step 902 where the next triple is examined.

This looping process in FIG. 900 continues until all of the triples have been examined and added to the set CHILDREN_RESULT so that all of the triples can optionally be examined and altered by the code shown in FIG. 8 (described above) after the function 600 stops calling the subroutine 900.

While the preferred embodiment of the invention has been described, numerous modifications and changes will occur to those who are skilled in the art. Accordingly, it is intended by the claims appended to and forming a part of this application to capture the true spirit and scope of the invention.

APPENDIX

The algorithm find_all_recommended_latest is implemented as a function returning a set of triples. The parameter are the set of patches installed on the users system as well as the roots of the patch trees which are applicable to the users system. It works by creating the necessary inputs and passing them to the recursive function find_installed_recommended_latest which processes a single patch tree starting from its root.

```
/*
     function find__all__installed__recommended__latest
     Given a set of installed patches as well as the roots of the patch
     trees which are applicable to a system, construct a set of triples
     (I, R, L), where I is either null or an installed patch, R is either null
     or a patch which is a successor to I which is the "recommended"
     successor to I, and L which is the last successor to I in I's patch
     chain. L will be the root of the patch tree containing both I and R.
     parameters:
     installed -- a set of patches installed on the system being analyzed.
     roots -- the roots of all patch trees applicable to the system.
     */
     function set find__all__installed__recommended__latest(installed, roots)
     {
     set triples = {};
     /*
          Iterate over each of the roots calling find__installed__recommended__latest
          and adding the result to the final set.
     */
     for r in roots
     do
          triples = triples union find__installed__recommended__latest(r,r,installed);
     done;
     return triples;
}
/*
     function find__installed__recommended__latest
     Given a set of installed patches as well as a root of a patch
     tree which is applicable to a system and, current, a patch in that tree,
     construct a set of triples (I, R, L), where I is either null or an
     installed patch, R is either null or a patch which is a successor
     to I which is the "recommended" successor to I with respect to the
     patch subtree rooted at current, and L which is the root of the patch
     tree.
     parameters:
     current -- a patch in the subtree rooted at root.
     root -- the root of a patch tree applicable to the system.
     installed -- a set of patches installed on the system being analyzed.
*/
function set find__installed__recommended__latest(current, root, installed)
{
     // base case -- current patch is installed.
     if (current in installed)
          return {(current,null,root)};
     // look at the children
     set children = immediate predecessors of current;
     children__result = {}     // accumulate all recommended triples
                               // by recursing against the children.
     current__is__better = false; // becomes true if the current patch is
                               // to be recommended.
     current__supersedes__installed = false; // becomes true if the current patch
                                    // supersedes a patch which has already been
                                    // installed.
     current__is__better__then__new__rec = false; // becomes true if the current patch
                                    // is better than one of the children
                                    // recommendations which does not supersede
                                    // an installed patch.
     // recurse on the children
     for child in children
     do
          set child__triples = find__installed__recommended__latest(child, root, installed);
               for triple in child__triples
          do
               // add the triple to total result.
               children__result.add(triple);
               if (current__is__better = = false) {
                  // determine if this triple is not for an installed patch
                  if (triple[0] = = null) {
                     // determine if this patch is at least as good as the
                     // triples recommended patch.
                     if ((triple[1] != null) && (current.rating > = triple[1].rating)) {
                        current__is__better__than__new__rec = true;
                     }
                  }
                  else {
                     current__supersedes__installed = true;
                     if(triple[1] != null) {
                        // there is a recommendation for this installed patch see
                        // if current is at least as good as the recommendation.
```

-continued

```
                    if (current.rating > = triple[1].rating) {
                        current__is__better = true;
                    }
                }
                else {
                    // there is no recommendation for this installed patch see
                    // if current is clearly better than the installed patch.
                    if ((current.rating = = 3) ||(current.rating > triple[0].rating)) {
                        current__is__better = true;
                    }
                }
            }
        }
    done
done
// recommend the current, if it is rated atleast 2 and there
// were no children producing results.
if ((children__result.cardinality = = 0) && (current.rating > = 2)) {
    current__is__better = true;
}
// recommend the current, if it is at least as good as a previous
// new recommendation and current does not supersede any installed
// patches.
if ((current__supersedes__installed = = false) &&
        (current__is__better__than__new__rec = = true)) {
        current__is__better = true;
}
// adjust the result of the recursion to include the current patch.
if (current__is__better = = true) {
        // create the result by adjusting the old recommended to
        // current (I,R,L) -> (I,current,L) and
        // add (null,R,L) if the result is empty.
            result = {};
            for triple in children__result
        do
            if (triple[0] != null) {
                result.add((triple[0],current,triple[2]));
            }
        done
            if (sizeof(result) = = 0) {
            result.add ((null,current,root));
        return result;
}
else {
        // current__is__better is false
        // recursion result was empty and current is the root
        if ((children__result.cardinality = = 0) && (current = = root)) {
            return {(null,null,root)};
        }
        else {
            // return the results from the recursion.
            return children__result;
        }
}
}
```

What is claimed is:

1. A method for selecting software patches for installation on a system comprising:

analyzing the system to identify any patches previously installed on the system;

obtaining one or more successor patches to at least some of the identified and previously installed patches, at least some patches rated as to reliability for installation;

comparing the reliability for installation of at least some patches to that of successor patches; and selecting patches as candidates for installation on the system based on the results of these comparisons.

2. The method of claim 1, further comprising indicating, when a replacement patch is selected, which previously installed patch, if any, a selected patch will displace.

3. The method of claim 1, further comprising:

analyzing the system to identify files or file sets installed on the system;

obtaining one or more patch trees including at least one patch and designated as patches for one or more of the identified files or file sets, at least some patches rated as to reliability for installation;

comparing the reliability for installation of at least some patches to that of successor patches in the patch trees; and selecting patches as candidates for installation on the system based on the results of these comparisons.

4. The method of claim 3, further comprising selecting as alternate candidates for installation other successor patches, if any, in each patch tree based upon their being the most current patches.

5. A method for selecting software patches for installation on a system, comprising:

analyzing the system to identify files or file sets installed on the system;

obtaining one or more patch trees including at least one patch and designated as patches for one or more of the identified files or file sets, at least some patches rated as to reliability for installation;

comparing the reliability for installation of at least some patches to that of successor patches in the patch trees; and selecting patches as candidates for installation on the system based on the results of these comparisons.

6. The method of claim 5, further comprising selecting as alternate candidates for installation other successor patches, if any, in each patch tree chosen based upon their being the most current patches.

7. An apparatus for selecting software patches for installation on a given system, the apparatus comprising:

a systems database containing information identifying at least some files or file sets installed on one or more systems including the given system;

a patches database containing software patches, an indication of the reliability for installation of at least some of the patches, and an indication of which files or file sets the patches are intended to repair, a patch tree database linking successor patches into patch trees; and at least one executable computer program having at least read access to said databases and containing one or more routines for determining, through access to the systems database, which files or file sets are installed on the given system, determining, through access to said patches and patch tree databases, which patches and patch trees are applicable to the files or file sets of the given system and also the reliability for installation of at least some of the patches, comparing the reliability for installation of at least some of the applicable patches to those of successor patches in the patch trees, and selecting from the applicable patches candidates for installation on the given system based on the results of these comparisons.

8. An apparatus in accordance with claim 7 wherein the computer programs further include one or more routines that also select from the applicable patches candidates for installation on the given system based upon the patches being the most current patches available, as indicated by their occupying the root position in patch trees that are applicable.

9. An apparatus in accordance with claim 7 wherein the systems database also identifies patches already installed on the systems; and wherein the computer programs further include one or more routines that identify patches already installed on the given system and the corresponding patch trees, identify any successor patches in the corresponding patch trees to the patches already installed on the given system, compare the reliability for installation of the already installed patches and any successor patches, and select from the successor patches candidates for installation on the given system based on the results of these comparisons.

10. An apparatus in accordance with claim 9 wherein the computer programs further include one or more routines that also select from the applicable patches candidates for installation on the given system based upon the patches being the most current patches available, as indicated by their occupying the root position in patch trees that are applicable.

11. An apparatus in accordance with claim 9 wherein the computer programs further include one or more routines that identify the patches already installed on the system and selected candidates that will displace these patches already installed on the system.

12. An apparatus in accordance with claim 9 wherein the computer programs further include one or more routines that also select from the applicable patches candidates for installation on the given system based upon the patches being the most current patches available, as indicated by their occupying the root position in patch trees that are applicable.

* * * * *